Sept. 27, 1932.   G. L. KELLEY   1,879,302
SHEET METAL WINDOW PANEL AND METHOD OF FORMING THE SAME
Filed June 9, 1930

INVENTOR.
GEORGE L. KELLEY
BY
ATTORNEY.

Patented Sept. 27, 1932

1,879,302

UNITED STATES PATENT OFFICE

GEORGE L. KELLEY, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SHEET METAL WINDOW PANEL AND METHOD OF FORMING THE SAME

Application filed June 9, 1930. Serial No. 459,943.

This invention relates to sheet metal continuous angular flanges for sheet metal panels or the like, adapted for use in forming window and door openings or ventilator openings in vehicle constructions.

In the manufacture of vehicular bodies and particularly in the manufacture of closed automobile bodies in which pressed sheet metal is generally used, it is the practice to form a sheet metal panel of a shape conforming to the shape of the window opening and having a continuous integral flange which extends into and closely fits the window opening. Inasmuch as such window openings are usually rectangular in shape, or at least of quadrilateral form, the continuous flange which projects into the window opening must necessarily have angular corners to correspond to the angular corners of the window frame.

Heretofore, in the manufacture of these window panels, in forming the angularly projecting flange at the corners of the same, the metal of the frame has either been drawn or flattened out by a process of hammering, or the like, in order to increase the area of sheet metal to form the angular corners of the continuous flange, or else the metal has been cut and an angular gusset piece has been welded to bridge the cut portions. Both of these methods have proven unsatisfactory as, even with expert workmanship, the final finished product has been found, in the first instance, to be extremely weak through cracking, and, in the second instance, to be weak because of imperfect welding.

A third method has been suggested and is now in general use, and this method is disclosed in the patent to C. W. Wells, #1,545,021, issued July 7, 1925. In this method provision is made for the cutting of an elongated slot at the corners of the sheet material from which the window panel is to be formed, and within this slot is welded an angular gusset piece having a continuous lateral flange receivable in the slot and welded edge to edge therein.

In this method also, considerable difficulty has been encountered, as it is not easy to properly perform the welding operation due to the fact that because of the resiliency of the angular gusset piece, proper pressure cannot be applied to the abutting edges of the material to be welded.

The principle object of the present invention, therefore, is to provide an improved method of forming an angularly shaped projecting flange so that the welding operation may be more efficiently carried out, and with less expense, and so that the welding will be more uniform than is the case with the previous methods outlined above.

A still further object of the invention is to provide a method of forming an angularly shaped inturned flange in window panels of this nature with a minimum amount of labor, and in such a manner as to be conducive to mass production.

Convenience of arrangement of parts, lightness, durability and corresponding inexpensive manufacture are further desiderata that have been borne in mind in the production and development of the present invention.

Other objects of the invention, not at this time more particularly enumerated, will become more readily apparent as the nature of the invention is better understood and the same consists in the novel construction combination and arrangements of parts shown in the accompanying one sheet of drawing in which.

In all of the above mentioned views, like characters of reference are employed to designate like characters throughout and a rectangular piece of sheet metal is shown at 10. This sheet metal piece is provided with a rectangular shaped opening 11 and is adapted to be subsequently shaped into the form of the window panel, having a front portion 12, and a continuous flange 13 of a shape corresponding to the shape of the window opening and adapted to be inserted into the same.

Figure 1:
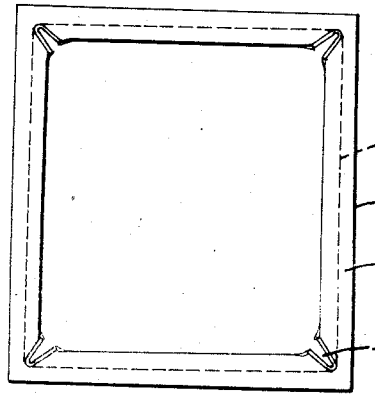
Fig. 1 is a plan view of a strip of sheet metal cut and stamped in accordance with the practice of the present invention prior to the formation of the angular window pannel corners.
Figure 2:
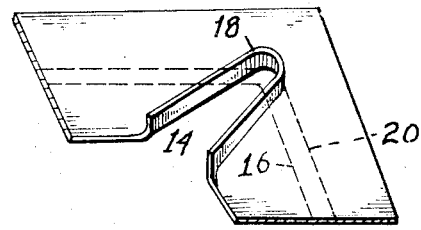
Fig. 2 is a fragmentary perspective view of one corner of the pre-formed sheet material showing the formation of the corners of the window panel, prior to its completed formation.

In shaping the material 10 to the desired form, and thus carrying out the present invention, a slot or recess 14, is formed at each corner of the strip by cutting away the metal diagonally of the corner from the corner of the opening to the score lines 16, and bending the material at the edge of the slot upwardly to provide the relatively narrow upstanding marginal flange 18 on the edge of each slot, thus increasing the depth of each slot to the score lines 20 which are preferably formed in the sheet material to insure accurate bending to properly form the slots and flanges. The sides of each flanged slot may be parallel to and equidistant from the vertical plane bisecting the angle between the edges forming the corners. The inner end of each slot is tangential to the score lines 20. However, if desired, the sides of each slot formed in the sheet material may be slightly divergent from the bisector of the corner angles, as clearly shown in Figure 2. while the slots 14 may be of any suitable width, it is preferable that the same be substantially of the width shown in the accompanying drawing, in order to insure efficiency of manufacture of these window panels.

Figure 3:
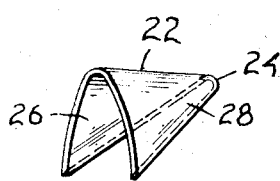
Fig. 3 is a perspective view of the angular gusset employed in connection with the present invention.
Figure 4:
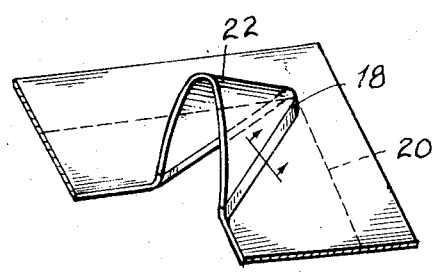
Fig. 4 is a fragmentary perspective view showing the gusset illustrated in Figure 3, welded in position, preparatory to bending of the same to form the corner flange of the panel.

Referring now to Figure 3, a gusset is shown at 22. This gusset is preferably formed of the same material as the material forming the incompleted window panel 10. The gusset is formed triangular in shape and is bent by dies into the form shown in this figure. One end portion of the gusset designated at 24 is rounded to correspond to the curvature of the inner end of the flange 18, surrounding each slot 14. The gusset 22 is provided with side portions 26 and 28, shaped to correspond to the side portions of the flange 18. The underneath edges of the gusset shown in Figure 3 lie in a single plane and are shaped to conform exactly to and register with the upper edge of the flange 18 so that the gusset may be placed upon the flange 18 edge to edge so that the external surface of the flange 18 and of the gusset 22 will be continuous, as shown in Figure 4.

Figure 7:
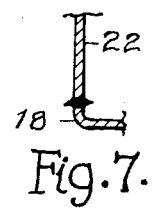
Figs. 7 and 8 are fragmentary sectional views showing the method by which the angular gusset may be welded in position to the sheet metal frame, forming the window panel.
Figure 8:
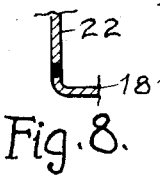

After forming the sheet of material 10 and the gusset members 22, these parts may be properly oriented with respect to each other, as described above, and the gusset members may then be welded in position to the flanges 18 by flash welding, as clearly shown in Figures 7 and 8.

Figure 5:
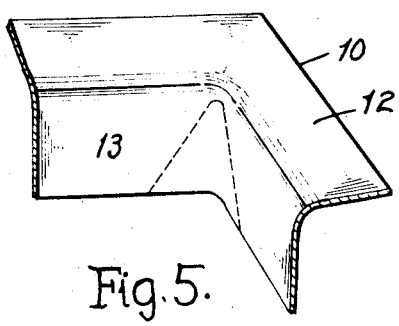
Fig. 5 is a fragmentary perspective view showing one corner of the completed sheet metal window panel.
Figure 6:
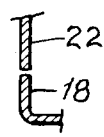
Fig. 6 is a fragmentary sectional view showing the angular gusset piece positioned above the sheet metal of the window frame panel, prior to the welding operation.

In performing this operation the main plate 10 may be positioned on any flat surface in such a manner that the flanges 18 extend upwardly. The gussets 22 may then properly be oriented as shown in Figure 6 with respect to the flanges, and electrodes (not shown) may be attached to the plate and gussets to apply to the same the proper voltages for carrying out the flash welding operation. During the flash welding, the pieces may be firmly pressed together in a direction at right angles to the plane of the plate, as shown in Figure 7 and the welded seam around the flange 18 may then be reduced as shown in Figure 8 to uniformity with the thickness of the sheet metal. As the joint thus formed is readily accessible, it is comparatively easy to carry out this reducing operation on the seam and when this is completed the material is then ready for the final operation of bending to form the continuous outturned flange 13. When the plate is ready for this final operation of forming the continuous flange the same may be turned so that the gusset members depend therefrom and the edge portions of the plate may then be bent downwardly at the score lines 20 into position at right angles to the plate, causing the gussets to be spread open so that the rounded portions 24 form the apexes of the corners of the continuous flange 13 and sides of the gussets form parts of the adjacent flange portions, as shown in Figure 5. It is obvious then that these gusset members provide the additional material necessary to form the corners without hammering or drawing the metal. It is also obvious that in carrying out the flash welding operation, the sheets may be properly supported and the gusset members to be secured thereto, may have the necessary pressure readily applied thereto for effective abutting during the welding operation.

It is to be distinctly understood that the invention is not to be limited to the exact arrangement of parts shown in the accompanying sheet of drawing and described in this specification, nor is it to be limited to the method set forth in this specification for forming the window panels. Only in so far as the invention is particularly pointed out in the appended claims is the same to be limited.

What I claim is:

1. The method of forming a continuous flange between adjacent sides of an angular sheet metal plate which comprises cutting away the metal adjacent the corner of said plate between the sides to form a diagonally extending slot, forming an integral marginal flange around the edge of said slot extending substantially at right angles to the plate, providing a folded gusset member having an edge conforming to and shaped to fit the edge of said marginal flange, bringing said edges together in abutting relation, applying pressure thereto in a direction normal to the plane of the plate and uniting the said edges by flash welding, reducing the welded seam to substantially the thickness of the sheet metal, whereby the surface of the gusset extends continuously with the surface of the plate, and bending the inner portions of the adjacent sides of the plate including said gusset at an angle to the plane of the plate to unfold said gusset and form a continuous flange.

2. A face plate blank having an opening and adapted to subsequently be bent to form a continuous inner flange surrounding said opening, said blank comprising a flat sheet metal of quadrilateral form, there being a diagonal slot in the inner side of said frame at each corner thereof, said slots each having an upstruck marginal surrounding flange extending substantially at right angles to the plane of said plate, and arched gussets each having edges corresponding in shape to the edges of said flange, the edges of one of said gussets being welded to the edges of each of said marginal flanges in abutting relation to form a continuous surface.

In testimony whereof I hereunto affix my signature.

GEORGE L. KELLEY.